US007034323B2

(12) United States Patent
Horn et al.

(10) Patent No.: US 7,034,323 B2
(45) Date of Patent: Apr. 25, 2006

(54) METHOD AND DEVICE FOR PERFORMING A TEST FOR ACCEPTABILITY OF BANK NOTES BY AUTOMATIC VENDING MACHINES

(75) Inventors: Erich Horn, Erkelenz (DE); Bernd Voeller, Mönchengladbach (DE)

(73) Assignee: Reheidt & Bachmann GmbH, (DE)

( * ) Notice: Subject to any disclaimer, the term of this patent is extended or adjusted under 35 U.S.C. 154(b) by 0 days.

(21) Appl. No.: 10/077,221

(22) Filed: Feb. 15, 2002

(65) Prior Publication Data

US 2002/0118872 A1 Aug. 29, 2002

(30) Foreign Application Priority Data

Feb. 24, 2001 (EP) ................................. 01104661

(51) Int. Cl.
*G06K 11/00* (2006.01)

(52) U.S. Cl. ...................... 250/556; 250/557; 235/381; 902/11; 382/311

(58) Field of Classification Search ................ 235/379, 235/381, 375; 902/8, 11, 14, 15, 17, 7; 250/556, 250/557; 382/135, 311; 194/302
See application file for complete search history.

(56) References Cited

U.S. PATENT DOCUMENTS

| | | | | |
|---|---|---|---|---|
| 4,580,040 | A * | 4/1986 | Granzow et al. | 235/379 |
| 4,813,077 | A * | 3/1989 | Woods et al. | 382/138 |
| 5,040,226 | A * | 8/1991 | Elischer et al. | 382/138 |
| 5,308,992 | A | 5/1994 | Crane et al. | 250/556 |
| 5,367,580 | A | 11/1994 | Kumagai | 382/294 |
| 5,537,486 | A * | 7/1996 | Stratigos et al. | 382/137 |
| 6,038,553 | A * | 3/2000 | Hyde, Jr. | 705/45 |
| 6,073,744 | A | 6/2000 | Raterman et al. | 194/207 |
| 6,363,164 | B1 * | 3/2002 | Jones et al. | 382/135 |
| 6,695,204 | B1 * | 2/2004 | Stinson et al. | 235/379 |
| 2004/0131230 | A1 * | 7/2004 | Paraskevakos | 382/100 |

FOREIGN PATENT DOCUMENTS

| | | |
|---|---|---|
| EP | 0 718 808 | 6/1996 |
| JP | 08 305923 | 11/1996 |

* cited by examiner

*Primary Examiner*—Thanh X. Luu
*Assistant Examiner*—Stephen Yam
(74) *Attorney, Agent, or Firm*—Cantor Colburn LLP

(57) ABSTRACT

In order to provide a procedure and a device that will enable the, at least partially, automated acceptance of bank notes that can be realized in an acceptable cost range and that will enable the highly automated, rapid acceptance of bank notes with a high level of certainty, a method, in which a test for the acceptability of bank notes is performed by automatic vending machines is proposed; by this method a bank note is fed via a transport unit to a digitalization station, where it is at least partially digitized; the data obtained in this manner are then compared with stored data by a computer unit, which makes a determination of value, and renders an automatic decision regarding acceptance. If the automatic decision regarding acceptance is negative, an image of the digitized data is generated in order to allow a service employee to perform a visual inspection of the note and render a final decision regarding acceptance.

13 Claims, 1 Drawing Sheet

METHOD AND DEVICE FOR PERFORMING A TEST FOR ACCEPTABILITY OF BANK NOTES BY AUTOMATIC VENDING MACHINES

FIELD OF THE INVENTION

The present invention relates to a method and a device for performing a test for acceptability of bank notes by automatic vending machines.

DESCRIPTION OF THE RELATED ART

In a large number of applications it is possible, and in some cases already common practice, for the payment for products and services to be made by inserting bank notes into automatic vending machines. Such applications are known, for example, in the purchase of train tickets, especially for local travel.

SUMMARY OF THE INVENTION

In many countries, at least a partial automatic acceptance of bank notes at mobile collection points is common; one example of this would be the so-called farebox systems at the entrances of buses, etc.

The automated acceptance of bank notes is generally associated with a number of problems.

A first aspect is the determination of value, in other words, the value of the inserted bank note must be established. A second aspect involves a test for validity; in other words, it must be determined whether the inserted bank note or the inserted document is valid. This involves the very general question of whether it is even a valid bank note and, if so, whether it is an acceptable bank note. Finally, there is the so-called test for authenticity.

Systems that comprise a test for authenticity are extremely expensive and costly, and they provide for only very narrow tolerance levels for deviation from the predetermined authenticity parameters to be examined. Vending machines that employ systems of this type are generally used only by financial institutions; they require a great deal of time due to the test for authenticity, and they have a high rejection or rejection rate due to the very narrow tolerance levels. Such systems are not suitable for use in automatic vending machines, especially in the above-mentioned mobile collection systems.

The other extreme involves the inspection of bank notes exclusively by service employees. It is common when boarding a bus, for example, for a bank note to be inserted into a device at a predetermined location, and positioned behind a plate so the bus driver can view it. The bus driver performs the above-mentioned inspection, with the exception of a final test for authenticity, and renders a decision as to the acceptance or rejection of the bank note, for example by pressing a button.

Systems that lie somewhere between these two extremes are frequently used in so-called automatic ticket vending machines where, although no exclusive tests for authenticity of the bank notes are conducted, an automatic, computerized determination of value is made, and a fully automatic test for acceptability is performed based upon an examination of parameters within very narrow tolerance levels. Systems of this type are known to have a very high rejection rate. This is due primarily to the fact that bank notes in circulation frequently have serious and in any case highly varied level of wear and tear. Hence, authentic bank notes quite frequently deviate from the idealized image of acceptability; in other words, they have notched edges and corners, washed-out areas, etc.

While the visual methods that depend entirely on service employees place the entire burden of decision upon the service employee and, furthermore, require a great deal of time which, especially in the process of boarding buses and in similar situations results in waiting periods and other disadvantages, especially during peak traffic hours. Fully automatic systems involving acceptability tests as described above involve excessive rejection rates, which result in unacceptable loss of time.

The person making payment is required to insert a bank note in a known manner several times, smoothing the note out, exchanging it for another, etc. This is especially unsuitable at high traffic mobile collection points.

SUMMARY OF THE INVENTION

Based upon the above-described state of the art, the objective of the present invention is to provide a method and a device that will eliminate the disadvantages associated with the current state of the art that can be realized at an acceptable cost level. That will enable a highly automated, rapid acceptance of bank notes with a high level of security.

With regard to the technical solution to the objective, a method is proposed by which a test to determine the acceptability of bank notes is performed by an automatic vending machine wherein a bank note is fed via an insertion unit to a digitization station where it is at least partially digitized; the received data are then compared with stored data by a computer unit, which makes a determination as to the value of the bank note and renders an automatic decision regarding its acceptability; if the automatic decision regarding acceptability is negative, an image of the digitized data is generated to allow a final decision regarding acceptability to be rendered by an attendant service employee based upon a visual inspection.

The method specified in the invention thus advantageously comprises the combination of computerized, automated methods of value determination and acceptability testing, with the possibility of a visual inspection, at least in questionable cases. The bank notes inserted into an automatic mobile collection unit are fed to a digitizing station; for example, they are positioned upon a transparent plate where they are electronically digitized. The digitization may include the entire bank note or only areas of the note, depending upon the bank note systems in that specific country.

This is followed by an electronic determination of value by comparison with stored data. If the various bank notes belonging to a currency system are scanned in ahead of time and are identified in terms of specific prominent points, then the value of every other bank note that is inserted into the machine can be determined precisely via a comparison of the image data. In accordance with one proposal for the invention, a scanner may be used to implement the digitization process; alternatively or in combination with this, digital cameras, etc. may also be used.

A successful determination of value is followed by a computerized test for acceptability. To accomplish this, individual parameters in the data set are compared with prestored data. The specific criteria can be adjusted as needed; hence tolerance ranges can be adjusted.

For this reason, the method specified in the invention also enables the use of self-learning software systems, which, after a certain period of time in use, will themselves establish different tolerance levels for different ranges of deviation.

If an inserted bank note meets the acceptance criteria, it is then further processed via corresponding units in the device, i.e. it is drawn in and fed to a currency storage unit and, if necessary, change is made or access is granted or some similar result is triggered.

If the bank note does not meet the criteria for acceptance, a negative automatic decision regarding acceptance is registered. At this point the digitized area of the bank note is displayed on the corresponding image display unit, to allow a visual inspection. This unit may be a monitor, an LCD display, projector, or other image display unit.

The service employee, for example a bus driver, can now inspect the scanned bank note visually, and register a decision regarding acceptance manually, for example by pressing a release button or, alternatively, a rejection button. A marking of the areas that resulted in the negative automatic decision regarding acceptance can be used to support the visual inspection of the digitized bank note. For example, torn off corners, nicked edges, washed-out areas, or other objectionable features can be marked in color. This will allow the service employee to render a decision very quickly.

In accordance with one advantageous version of the invention, a negative automatic decision regarding acceptance may be followed by a second, intermediate inspection to determine which deviations, based upon areas, surfaces, etc. formed the basis of this negative automatic decision. In this case as well, adjustable tolerance ranges may be preset in the system. Thus, the computer can decide beforehand, fully automatically, whether the objectionable bank note is excluded entirely from acceptance or lies within a certain tolerance range in which a visual inspection should be performed or would make sense.

The imaging of the digitized bank note may be limited to cases that call for a visual inspection, or may be performed in every case.

With regard to the device, the invention proposes a device designed to automatically accept bank notes with a test for acceptability that employs a method in accordance with one of the claims 1 through 6, and comprising at least one unit for accepting bank notes, a transport/feed unit, a digitizing unit, a computer unit, an image display unit, an input unit, and a unit for returning, passing on, collecting, and stacking the bank notes.

A device, as specified in the invention, comprises an area designed to accept a bank note, for example a slit designed for insertion of the note. Via mechanical transport units, usually motorized, the bank note is then fed to an area in which it is fully or partially digitized, for which purpose a scanner, a digital camera, and/or some similar device may be used. For example, the digitization area may be an area in which the bank note is positioned as flat as possible on a transparent plate. However, passing the bank note in front of a bar or bar code scanner also lies within the scope of the invention.

After digitization, the determination of value and the examination for acceptability are performed by a comparison of the data obtained from the digitization with the stored data, within the framework of preset tolerance parameters. In this, the digitized image data may be compared directly, or after further processing.

At least if the automatic decision regarding acceptance is negative, an image of the bank note or at least the digitized areas of the note is generated on an image display unit. A decision is then awaited from the service employee, which is registered for example by pressing a button, etc.

In accordance with the invention, if the decision regarding acceptance is positive, whether automatic or rendered by a service employee, the bank note is then advanced through the system, and is filed, stacked, and if necessary subjected to other further processing, etc., for which purpose the device is equipped with appropriate equipment.

In accordance with one advantageous proposal of the invention, the device may comprise additional signal units, so that, for example, if the automatic decision regarding acceptance is negative, an acoustic or optical signal may be generated, to alert the service employee to the need to inspect the note visually.

The invention provides methods and devices that can be realized at low financial cost, and that enable a determination of value and a test for acceptability of bank notes inserted into automatic vending/collection machines within an acceptable period of time, with a low rejection rate with a high degree of certainty.

Processing and devices of this type are suitable for use in a wide range of applications, for example for mobile collection units in buses, airplanes, trains, etc., but also for ticket purchasing in train stations, airports, parking lots, etc., where service employees are centrally located at some point and are available to perform image inspections and make supplementary decisions regarding the acceptability of bank notes.

Additional advantages and characterizing features of the invention are found in the following description, with reference to the diagram. The diagram shows:

DETAILED DESCRIPTION

Figure 1:
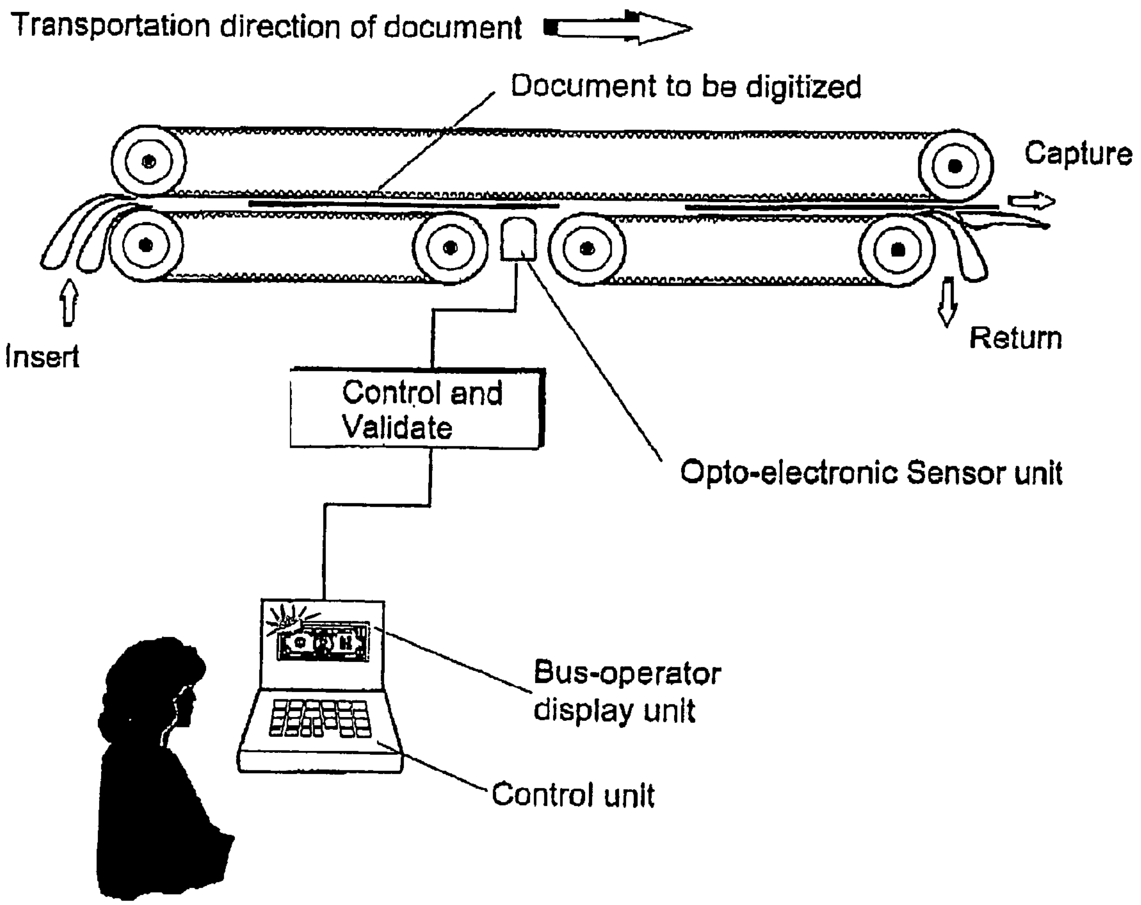
FIG. 1 a schematic illustration of the processing method and the equipment used to implement this process in accordance with the invention.

According to FIG. 1, a document, such as a bank note, is inserted at the “Insert” position. A digitization occurs at an opto-electronic sensor unit. The document is fed between transport devices for digitization. The determination of value, on the one hand, and test for acceptability, on the other, are performed in a computer unit. At the same time an image is displayed on a display unit, for example, to a bus driver or some other service employee, allowing him to register his own corresponding decisions via a control unit.

The above-described exemplary structural example serves only for descriptive purposes and should not be considered a limitation of the invention.

The invention claimed is:

1. A method for performing a test for acceptability in the reception of bank notes by automatic vending machines, the method comprising:

feeding a bank note at an automatic vending machine configured to provide payment for products and services;

transporting said bank note to a digitization station via a transport unit;

at least partially digitizing the bank note to create digitized data;

comparing the digitized data with a stored data of bank notes belonging to a currency system scanned in ahead of time in a computer unit, the computer unit performs a determination of value, and renders an automatic decision regarding acceptability;

if the automatic decision regarding acceptability is negative, performing a detailed inspection of adjustable parameters in order that a preliminary decision between a direct rejection of the banknote and a final decision by a service employee may be rendered automatically; and if said preliminary decision is a final decision by a service employee, generating an image of the digitized data in order to allow its visual inspection by a service employee, who then renders a final decision regarding acceptability; and during the generating of the image, automatically marking areas of deviation that prompted the negative automatic decision regarding acceptability.

2. The method in accordance with claim 1, wherein the digitizing of the bank note is accomplished by scanning.

3. The method in accordance with claim 1, further comprising performing an image data comparison in form of data comparison.

4. The method in accordance with claim 1 wherein the service employee via keyboard input registers the final decision regarding acceptance.

5. A device used in automatic vending machines to accept bank notes, with a test for acceptability, the device comprising:

an automatic vending machine configured to receive a bank note and to provide payment for products and services;

a transport/feed unit;

a digitization unit for generating digitized data of a banknote to be accepted;

a computer unit for comparing digitized data generated by said digitization unit with a stored data of banknotes belonging to a currency system scanned in ahead of time in said computer unit, for determining a value of said banknote and for rendering an automatic decision regarding acceptability;

a unit for adjustable parameters for performing a detailed inspection such that a preliminary decision between a direct rejection of the banknote and a final decision by a service employee may be rendered automatically;

an image display unit for generating an image of the digitized data in order to allow its inspection by said service employee who renders a final decision regarding acceptability if the automatic decision regarding acceptability is negative;

an input unit;

a unit for returning, advancing, collecting, and stacking the bank notes; and a means for automatically marking areas of deviation or deviation of authenticity parameters in said generated image that prompted the negative automatic decision regarding acceptability during generation of the image;

wherein at least the unit for receiving a bank note and the image display unit are disposed in one location.

6. The device in accordance with claim 5, wherein the digitalization unit is a scanner.

7. The device in accordance with claim 5, wherein the digitalization unit is a digital camera.

8. The device in accordance with claim 5, wherein the image display unit is a monitor.

9. The device in accordance with claim 5, wherein the input unit is a keyboard.

10. The device in accordance with claim 5, further comprising supplementary signal units for optical and acoustic indicators.

11. The device in accordance with claim 5, further comprising supplementary signal units for optical or acoustic indicators.

12. The device in accordance with claim 5, further comprising a device for suspending a service and/or a product.

13. A device used in automatic vending machines to accept bank notes, with a test for acceptability, the device comprising: an automatic vending machine configured to receive a bank note and to provide payment for products and services, a transport/feed unit, a digitization unit for at least partially digitizing the bank note to create digitized data, means for comparing the digitized data with a stored data of bank notes belonging to a currency system scanned in ahead of time, an image display unit, an input unit, and a unit for returning, advancing, collecting, and stacking the bank notes.

* * * * *

UNITED STATES PATENT AND TRADEMARK OFFICE

CERTIFICATE OF CORRECTION

PATENT NO. : 7,034,323 B2 Page 1 of 1
APPLICATION NO. : 10/077221
DATED : April 25, 2006
INVENTOR(S) : Erich Horn et al.

It is certified that error appears in the above-identified patent and that said Letters Patent is hereby corrected as shown below:

Title Page,
Item (73) Assignee, delete “Reheidt”, and insert therefor --Scheidt--.

Column 6,
Line 31, after “for”, delete “suspending” and insert therefor --dispensing--.
Line 40, after “time”, insert --the means for comparing performing a determination of value and rendering an automatic decision regarding acceptability, means for performing an inspection of adjustable parameters to render a preliminary decision between a direct rejection of the bank note and a final decision by a service employee based on a negative decision regarding acceptability,--.
Line 40, after “unit”, insert --generating an image of the digitized data allowing visual inspection by the service employee rendering a final decision regarding acceptability if the preliminary decision is the final decision by a service employee, means for marking areas of deviation in the image based on a result of a negative decision regarding acceptability,--.

Signed and Sealed this

Sixteenth Day of January, 2007

JON W. DUDAS
*Director of the United States Patent and Trademark Office*